United States Patent
Watanabe et al.

(10) Patent No.: US 10,207,368 B2
(45) Date of Patent: Feb. 19, 2019

(54) LASER CUTTING APPARATUS AND LASER CUTTING METHOD

(71) Applicant: MITSUBISHI HEAVY INDUSTRIES, LTD., Tokyo (JP)

(72) Inventors: Masao Watanabe, Tokyo (JP); Taiichirou Koga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 507 days.

(21) Appl. No.: 14/048,707

(22) Filed: Oct. 8, 2013

(65) Prior Publication Data
US 2014/0131328 A1  May 15, 2014

(30) Foreign Application Priority Data
Nov. 14, 2012  (JP) .................. 2012-250231

(51) Int. Cl.
| | |
|---|---|
| *B23K 26/00* | (2014.01) |
| *B23K 26/08* | (2014.01) |
| *B23K 26/38* | (2014.01) |
| *B23K 26/03* | (2006.01) |
| *B23K 26/06* | (2014.01) |

(52) U.S. Cl.
CPC .............. *B23K 26/38* (2013.01); *B23K 26/03* (2013.01); *B23K 26/06* (2013.01); *B23K 26/08* (2013.01)

(58) Field of Classification Search
CPC ............. B23K 26/03; B23K 26/032; B23K 26/04–26/045; B23K 26/06; B23K 26/0626; B23K 26/08; B23K 26/10; B23K 26/38

USPC ......................... 219/121.6–121.83
See application file for complete search history.

(56) References Cited

U.S. PATENT DOCUMENTS

| | | | |
|---|---|---|---|
| 4,303,301 A | * | 12/1981 | Teichert .................. B61G 5/10 385/73 |
| 5,095,517 A | | 3/1992 | Monguzzi et al. |
| 5,660,748 A | | 8/1997 | Tanaka et al. |
| 5,684,642 A | * | 11/1997 | Zumoto ............... B23K 26/032 359/739 |

(Continued)

FOREIGN PATENT DOCUMENTS

| | | |
|---|---|---|
| FR | 2 973 726 | 10/2012 |
| JP | 2001-116957 | 4/2001 |

(Continued)

OTHER PUBLICATIONS

English Machine Translation of JP2012-024794, Feb. 2012.*

(Continued)

*Primary Examiner* — Sang Y Paik
(74) *Attorney, Agent, or Firm* — Wenderoth, Lind & Ponack, L.L.P.

(57) ABSTRACT

A laser cutting apparatus that cuts a workpiece by radiating a laser beam thereon. The laser cutting apparatus is provided with a laser entrance portion to which an optical fiber that transmits the laser beam is fixed and an optical system through which the laser beam radiated from the optical fiber fixed by the laser entrance portion passes. The laser entrance portion includes a moving portion that moves or tilts the optical fiber with respect to the optical system and a fixing portion that fixes the moved or tilted optical fiber with respect to the optical system.

3 Claims, 9 Drawing Sheets

(56) References Cited

U.S. PATENT DOCUMENTS

| | | | | |
|---|---|---|---|---|
| 5,937,123 | A | * | 8/1999 | Frelier ................... G02B 6/32 385/134 |
| 7,847,213 | B1 | * | 12/2010 | Anikitchev ............ B23K 26/06 219/121.61 |
| 2009/0173724 | A1 | * | 7/2009 | Ogino et al. ............. 219/121.75 |
| 2010/0320177 | A1 | * | 12/2010 | Ramsayer ................ 219/121.67 |

FOREIGN PATENT DOCUMENTS

| | | |
|---|---|---|
| JP | 2001-138084 | 5/2001 |
| JP | 2003-154477 | 5/2003 |
| JP | 2006-82106 | 3/2006 |
| JP | 2006-122927 | 5/2006 |
| JP | 2012-24794 | 2/2012 |
| WO | 2007/046498 | 4/2007 |

OTHER PUBLICATIONS

Office Action dated Sep. 16, 2014 in corresponding Japanese patent application No. 2012-250231 (with English translation).
Extended European Search Report dated Mar. 25, 2014 in corresponding European patent application No. 13 18 7865.
Decision of Rejection dated May 19, 2015 in corresponding Japanese patent application No. 2012-250231 (with English translation).
JWES Joining and Welding Technique Q&A 1000, The Japan Welding Engineering Society, 2004, with English translation.
Trial Decision issued Apr. 26, 2016 in Japanese patent application No. 2012-250231 (with English translation).

* cited by examiner

LASER CUTTING APPARATUS AND LASER CUTTING METHOD

CROSS REFERENCE TO RELATED APPLICATIONS

This application claims benefit of Japanese Patent Application No. 2012-250231, the content of which is incorporated herein by reference.

BACKGROUND OF THE INVENTION

1. Technical Field

The present invention relates to a laser cutting apparatus and a laser cutting method.

2. Description of the Related Art

With a laser cutting apparatus, a laser beam is transmitted to a cutting head from a laser oscillator via an optical fiber, and the laser beam is focused by lenses in the cutting head to increase the energy density of the laser beam, thereby cutting a workpiece. Here, the workpiece is a metal, an alloy, or the like. Examples of the laser oscillator include a fiber laser oscillator in which an optical fiber itself is used as a medium.

Japanese Unexamined Patent Application, Publication No. 2003-154477 discloses an invention related to a laser cutting method, a laser cutting apparatus, and a technique in which adjustment for mechanical relative displacement (alignment adjustment) of resonator mirrors is eliminated, thereby realizing a laser-intensity distribution exhibiting a sharp peak.

SUMMARY OF THE INVENTION

1. Technical Problem

Figure 8:
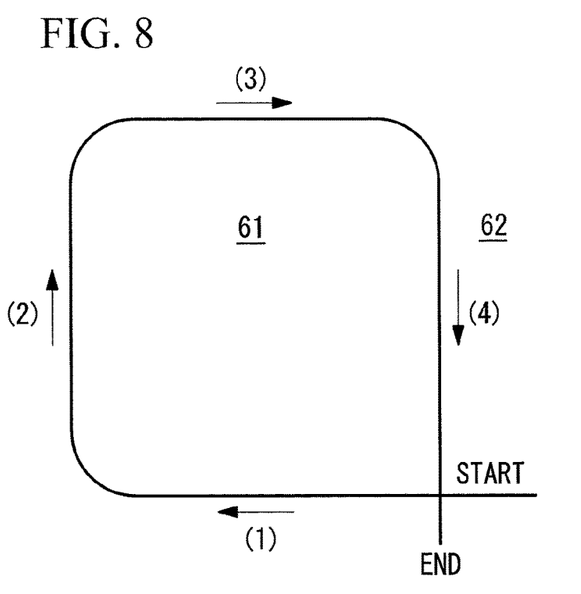
FIG. 8 is a plan view showing a workpiece and cutting directions of the workpiece.
Figure 10:
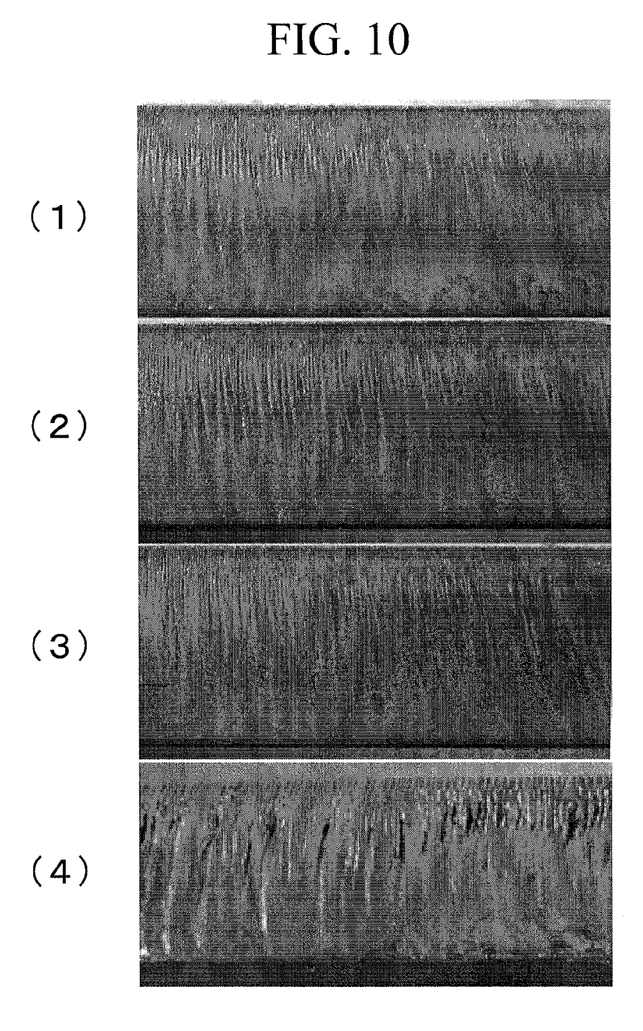
FIG. 10 is a photograph showing cut surfaces of a workpiece that has been cut by using the laser cutting apparatus according to the embodiment of the present invention.

For example, when a thick plate of about 10 mm to 50 mm is cut by using a laser cutting apparatus, unlike the case of cutting a thin plate, a rough cut surface is sometimes formed, as shown in FIG. 10(4). Or, a roughly-formed cut surface becomes more prominent as compared with the case of a thin plate. In particular, as shown in FIG. 8, when the cutting direction to cut a workpiece is changed (directions (1) to (4) in the figure) while maintaining a cutting head in a fixed state without rotating it about its axis, sometimes a fine cut surface and a rough cut surface are obtained, and thus, the quality of the obtained cut surfaces sometimes differs depending on the cutting direction. FIG. 8 shows an example in which a single plate-like member is cut and divided into an inner member 61 and an outer member 62. The cut surfaces (1) to (4) in FIG. 10 show the cut surfaces of the inner member 61 in FIG. 8, which are corresponding to the directions (1) to (4) in FIG. 8, respectively.

The present invention has been made in light of the above-described circumstances, and an object thereof is to provide a laser cutting apparatus and a laser cutting method with which the roughness of the resulting cut surfaces can be made homogeneous regardless of the cutting directions.

2. Solution to the Problem

Figure 9:
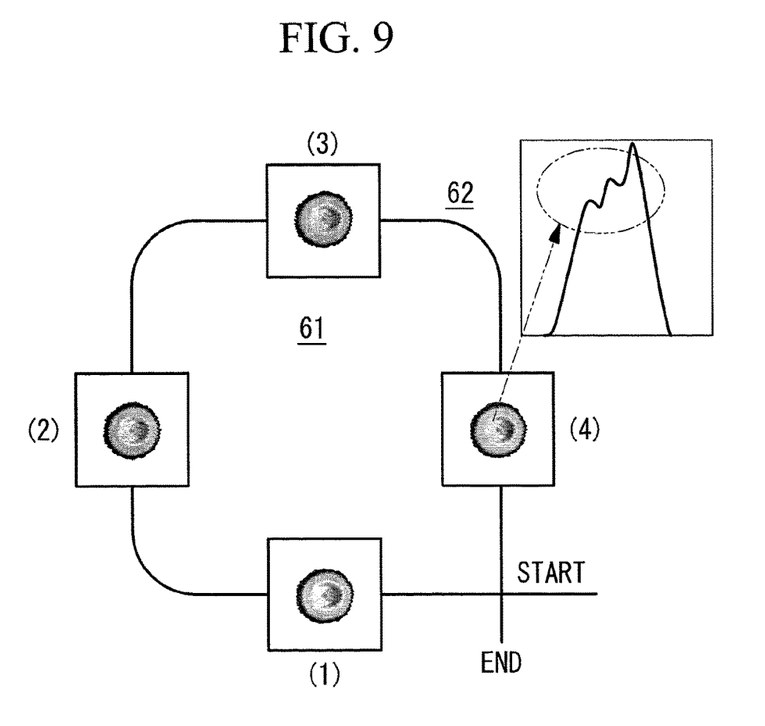
FIG. 9 is a diagram showing an energy-intensity distribution of a laser beam, as compared with FIG. 8.

By investigating the causes of the differing quality of the obtained cut surfaces depending on the cutting direction when the cutting direction of a workpiece is changed while maintaining a cutting head in a fixed state without rotating it about its axis, the inventors of the present application gained the following knowledge. Specifically, when the energy-intensity distribution was measured at the processing point by a laser beam emitted from a laser oscillator, it was found that an intensity peak at the processing point was biased toward one direction, as shown in FIG. 9. Also, it was found that this intensity peak was due to individual variability among the laser beams emitted from laser oscillators, as well as tolerated manufacturing and assembling errors of the cutting heads.

A laser cutting apparatus according to a first aspect of the present invention is a laser cutting apparatus for cutting a workpiece by radiating a laser beam thereon. The laser cutting apparatus includes a laser entrance portion to which an optical fiber that transmits the laser beam is fixed; and a lens through which the laser beam radiated from the optical fiber fixed by the laser entrance portion passes. The laser entrance portion includes a moving portion for moving or tilting the optical fiber with respect to the lens, and a fixing portion that fixes the moved or tilted optical fiber with respect to the lens.

With this configuration, the laser beam is radiated from the optical fiber to the lens, and the laser beam passes through the lens. The laser beam that has passed through the lens is focused, and the workpiece is cut by utilizing the energy density thereof. The energy-intensity distribution of the laser beam is changed at the position at which the workpiece is cut by adjusting the positional relationship between the laser entrance portion and the lens or the angle formed therebetween. Then, the workpiece can be cut while maintaining the changed energy-intensity distribution by fixing the position or the angle of the optical fiber with respect to the lens by means of the fixing portion.

When a plane that includes the direction perpendicular to the beam axis of the laser beams which is radiated to the workpiece is assumed to be the X-Y plane, individual variability among the laser beams emitted from oscillators and tolerated manufacturing and assembling errors of the cutting heads are eliminated by making an adjustment so as to achieve a substantially uniform energy-intensity distribution in the X-Y plane. As a result, because portions of the laser beams having low intensities do not come in contact with the workpiece, it is possible to prevent the formation of rough cut surfaces due to oxidation or the like.

A second aspect of the present invention may additionally include, in the above-described first aspect, an intensity-distribution measuring portion that measures an energy-intensity distribution of the laser beam radiated from the lens, wherein the moving portion is configured to move or tilt the optical fiber based on the measured energy-intensity distribution.

With this configuration, because the positional relationship between the laser entrance portion and the lens or the angle formed therebetween is adjusted while measuring the energy-intensity distribution of the laser beam, the optical fiber can be fixed with respect to the lens at a more appropriate position or angle.

In addition, a laser cutting method according to a third aspect of the present invention is a laser cutting method for cutting a workpiece by radiating a laser beam thereon, by using a laser cutting apparatus including a laser entrance portion to which an optical fiber that transmits the laser beam is fixed and a lens through which the laser beam radiated from the optical fiber fixed by the laser entrance portion passes. The laser cutting method comprises: moving or tilting the optical fiber fixed by the laser entrance portion with respect to the lens; and fixing the moved or tilted optical fiber with respect to the lens.

3. Advantageous Effect of the Invention

With the present invention, by adjusting the positional relationship between a laser entrance portion and a lens or an angle formed therebetween, it is possible to change the energy-intensity distribution of a laser beam at a position at which a workpiece is cut. Therefore the roughness of the resulting cut surfaces can be made homogeneous regardless of the cutting directions.

DETAILED DESCRIPTION OF THE INVENTION

An embodiment according to the present invention will be described below with reference to the drawings.

Figure 1:
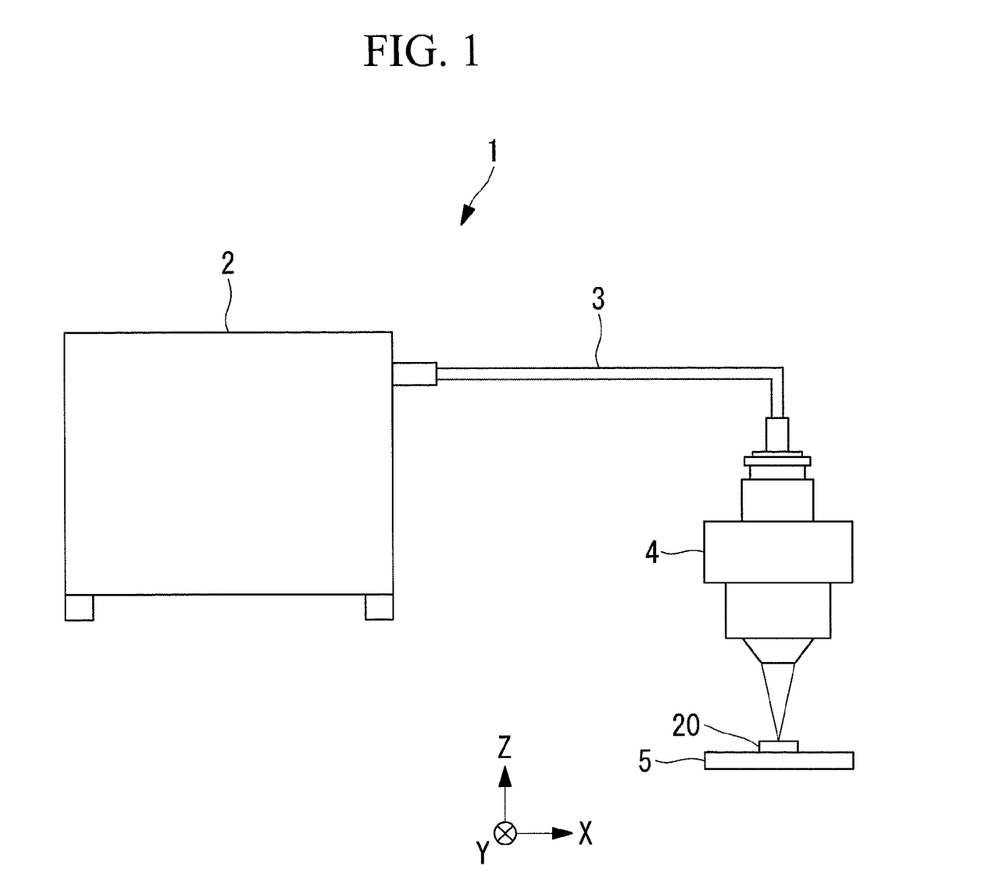
FIG. 1 is a schematic diagram showing a configuration of a laser cutting apparatus according to an embodiment of the present invention.

First, a laser cutting apparatus 1 according to the embodiment of the present invention will be described. As shown in FIG. 1, the laser cutting apparatus 1 is provided with a laser oscillator 2, an optical fiber 3, a cutting head 4, a processing stage 5, and so forth.

With the laser cutting apparatus 1, a laser beam is transmitted to the cutting head 4 from the laser oscillator 2 via the optical fiber 3, and the laser beam is focused by lenses in the cutting head 4 to increase the energy density of the laser beam, thereby cutting a workpiece 20. Here, the workpiece 20 is a metal, an alloy, or the like. The laser cutting apparatus 1 of this embodiment is suitable for cutting a plate-like member having a thickness of about 10 mm to 50 mm.

The laser oscillator 2 is, for example, a fiber laser oscillator in which an optical fiber itself is used as a medium. In the case of a fiber laser oscillator, a laser beam having a wavelength of 1070 nm to 1080 nm can be obtained. The laser beam generated by the laser oscillator 2 is transmitted through the optical fiber 3. Note that the present invention is not limited to a fiber laser, and it can be applied to a $CO_2$ laser, a YAG laser, and so forth.

The optical fiber 3 is connected to the laser oscillator 2 at one end and is connected to the cutting head 4 at the other end. The optical fiber 3 transmits the laser beam from the laser oscillator 2 to the cutting head 4.

Figure 2:
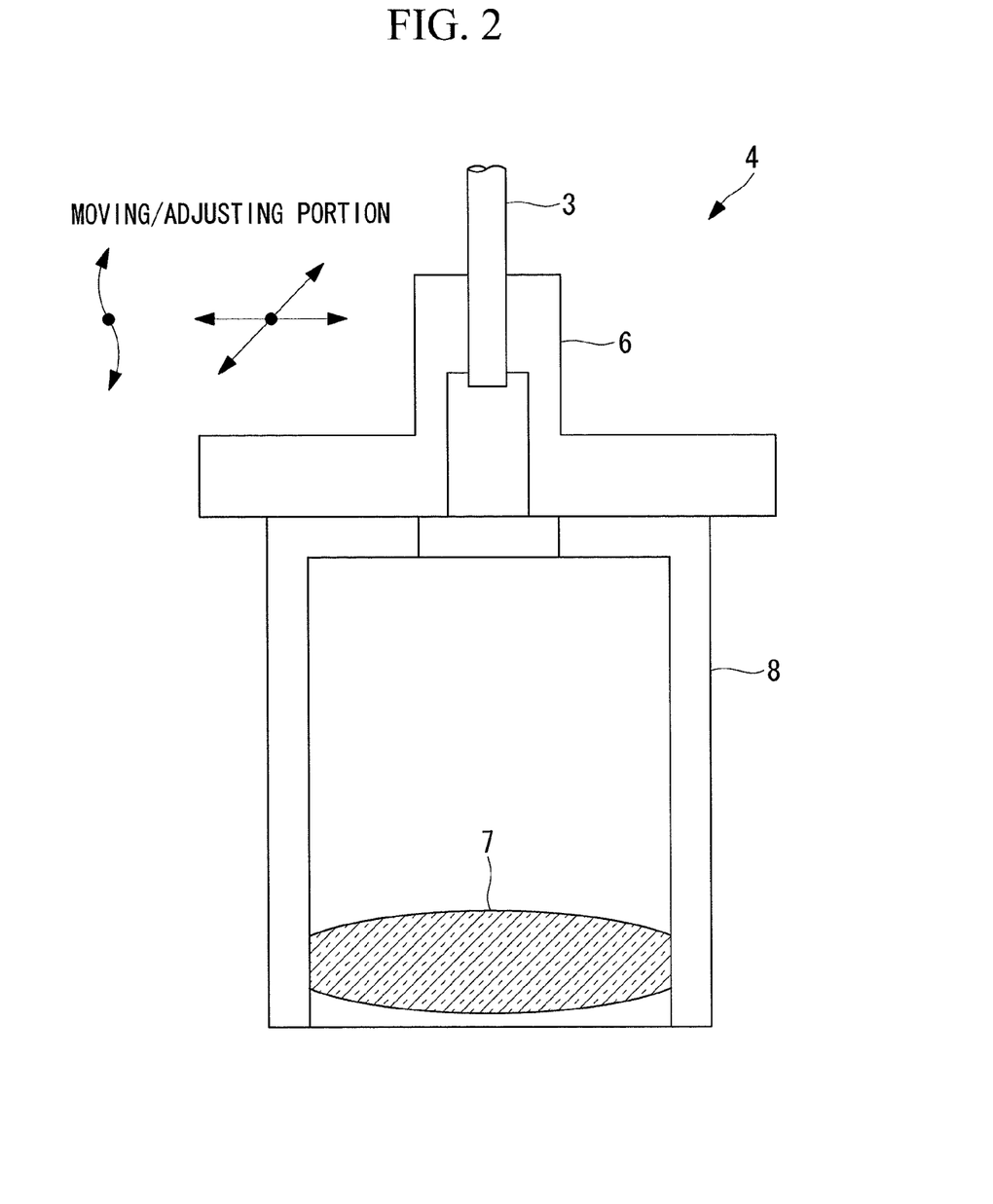
FIG. 2 is a longitudinal sectional view showing a cutting head of the laser cutting apparatus according to the embodiment of the present invention.

As shown in FIG. 2, the cutting head 4 is provided with a laser entrance portion that includes a moving portion 6 and a supporting portion 8, an optical system 7, and so forth. The moving portion 6 of the laser entrance portion is connected to an end of the optical fiber 3, and the laser beam transmitted by the optical fiber 3 is radiated toward the optical system 7. The optical system 7 is constituted of one or a plurality of lenses, such as focusing lenses or the like, and focuses the laser beam radiated from the optical fiber 3. By doing so, it is possible to achieve a high energy density that is enough to cut the workpiece 20.

As shown in FIG. 1, the processing stage 5 is moved in a plane as a flat surface (X-Y plane) perpendicular to the beam axis of the laser beam. The workpiece 20 is placed on the processing stage 5. By doing so, the workpiece 20 can be moved in the X-Y plane with respect to the cutting head 4. Note that, although a case in which the cutting head 4 is fixed will be described in this embodiment, the present invention is not limited to this example. For example, the present invention can also be applied to a case in which the workpiece 20 is fixed at one location, and the workpiece 20 is cut by moving the cutting head 4.

With the above-described laser cutting apparatus 1 of this embodiment, the laser oscillator 2 generates a laser beam, the generated laser beam passes through the optical fiber 3, and thus, the laser beam is radiated toward the workpiece 20 from the cutting head 4. When cutting the workpiece 20, the processing stage 5 on which the workpiece 20 is placed is moved in the X-Y plane, and thus, the workpiece 20 is cut in a straight line or in a curved line.

Next, the laser entrance portion provided in the cutting head 4 of the laser cutting apparatus 1 according to this embodiment will be described with reference to FIG. 2.

The moving portion 6 is installed on the optical fiber 3 side of the supporting portion 8 that accommodates the optical system 7. The moving portion 6 holds the optical fiber 3. The moving portion 6 can be moved in a plane as a flat surface (X-Y plane) perpendicular to the beam axis of the laser beam. Accordingly, the moving portion 6 is moved in the X-Y plane with respect to the optical system 7 fixed to the supporting portion 8. As a result, by adjusting the positional relationship between the optical fiber 3 held by the moving portion 6 and the optical system 7 fixed to the supporting portion 8, it is possible to change the energy-intensity distribution of the laser beam at a position (processing point) at which the workpiece 20 is cut.

Figure 3:
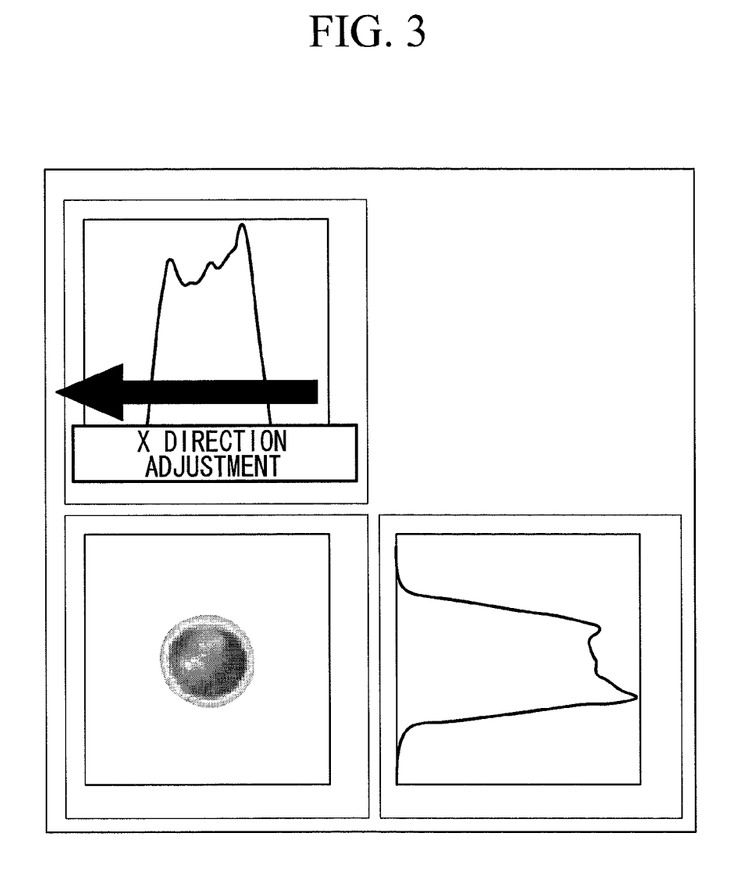
FIG. 3 is a diagram showing an energy-intensity distribution of a laser beam.
Figure 4:
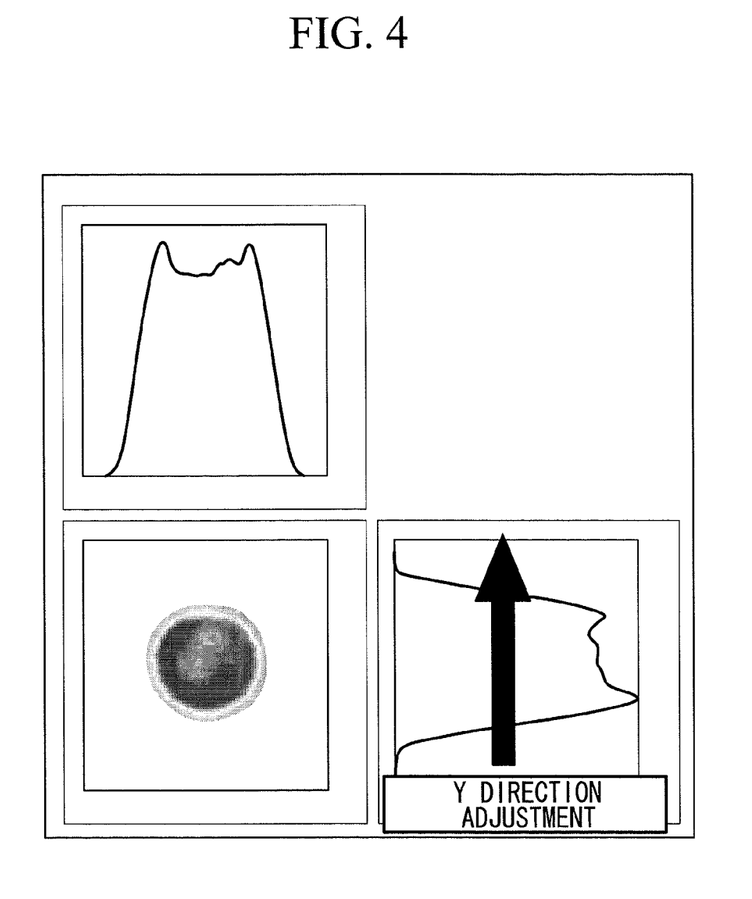
FIG. 4 is a diagram showing an energy-intensity distribution of a laser beam.

Specifically, the position of the moving portion 6 in the X-Y plane is changed so that the energy-intensity distribution of the laser beams becomes substantially uniform in the X-Y plane at the processing point. As shown in FIGS. 3 and 4, for example, in the case in which regions having high energy intensities and regions having low energy intensities exist, a uniform energy-intensity distribution can be achieved by moving the moving portion 6 toward the regions having low energy intensities. Note that, depending on the types of lenses in the optical system 7 and the arrangement thereof, it is also possible to achieve a uniform energy-intensity distribution by, in contrast, moving the moving portion 6 toward the regions having high energy intensities.

As shown in FIG. 2, the supporting portion 8 holds the optical system 7 inside a cylindrically shaped portion. The top surface of the supporting portion 8 and the bottom surface of the moving portion 6 are provided so as to be parallel to each other in the X-Y plane.

The moving portion 6 and the supporting portion 8 are fixed to each other by, for example, tightening fixing screws (not shown), after the relative positions thereof are adjusted, in other words, after their relative positions have been changed. Note that the fixing screw is an example of a fixing part that fixes the optical fiber 3 with respect to the optical system 7 after moving and adjusting the optical fiber 3. Accordingly, the laser beam is radiated from the optical fiber 3 toward the processing point in a state in which the relative positions of the moving portion 6 and the supporting portion 8 are fixed.

The position of the moving portion 6 with respect to the supporting portion 8 is changed while measuring the energy-intensity distribution of the laser beam at the processing point. Note that the moving portion 6 or the supporting portion 8 is provided with a moving/adjusting portion (not shown) that includes a mechanism for moving the moving portion 6 relative to the supporting portion 8 in the X-Y plane.

Next, the energy-intensity distribution of the laser beam at the processing point will be described.

Figure 5:
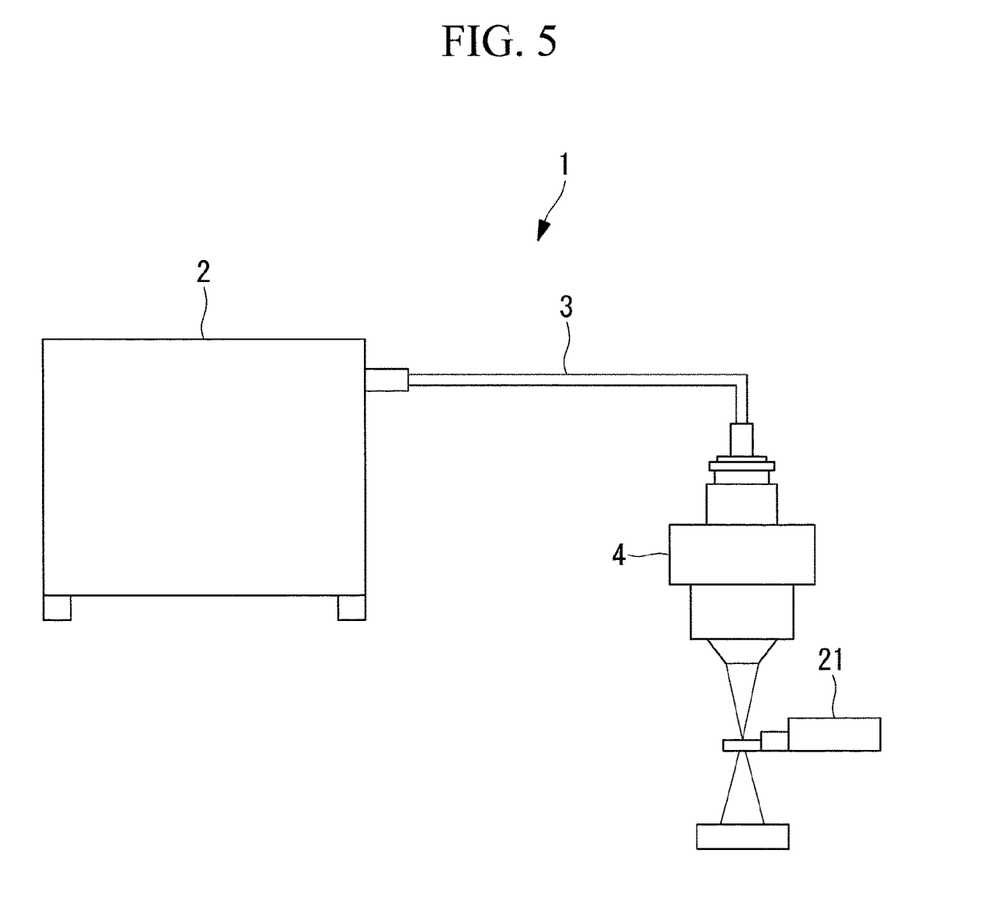
FIG. 5 is a schematic diagram showing the laser cutting apparatus and a beam-mode measurement unit according to the embodiment of the present invention.

As shown in FIG. 5, the energy-intensity distribution of the laser beam at the processing point is measured by a beam-mode measurement unit (beam profiler) 21. The beam-mode measurement unit 21 is disposed in the optical axis of the laser beam when adjusting the position of the moving portion 6.

Figure 6:
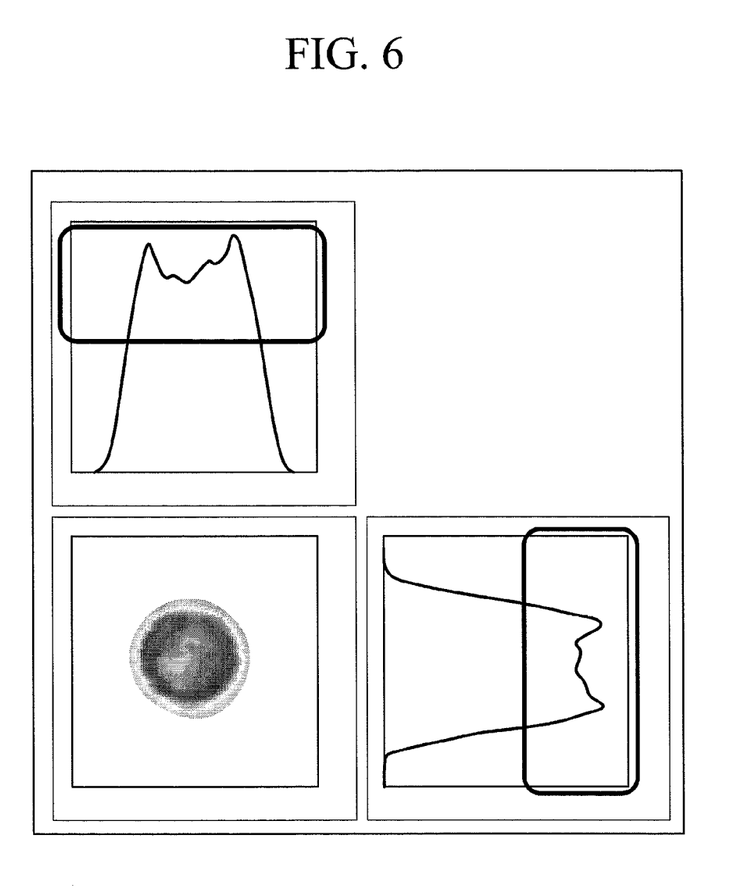
FIG. 6 is a diagram showing an energy-intensity distribution of a laser beam.

The energy-intensity distribution represents the distribution of the laser-beam energy intensity at the processing point or near the processing point. As shown in FIG. 6, it is preferable that the adjustment be performed so that intensity-peak portions become substantially equal across the X-Y plane, in other words, so that the energy-intensity distribution is adjusted to have a ring shape. For example, when the axis of the optical fiber 3 fixed to the moving portion 6 is disposed so as to be aligned with the axis of the optical system 7, the intensity distribution becomes uneven, and peak portions may be formed only in a deviated portion, as shown in FIGS. 3 and 4. In this case, as shown in FIG. 8, cutting a workpiece in the four directions results in cut surfaces having extremely rough surfaces. This is likely because the oxidation balance is lost at cut portions resulting from cutting with laser beams having weak energy intensities.

Figure 7:
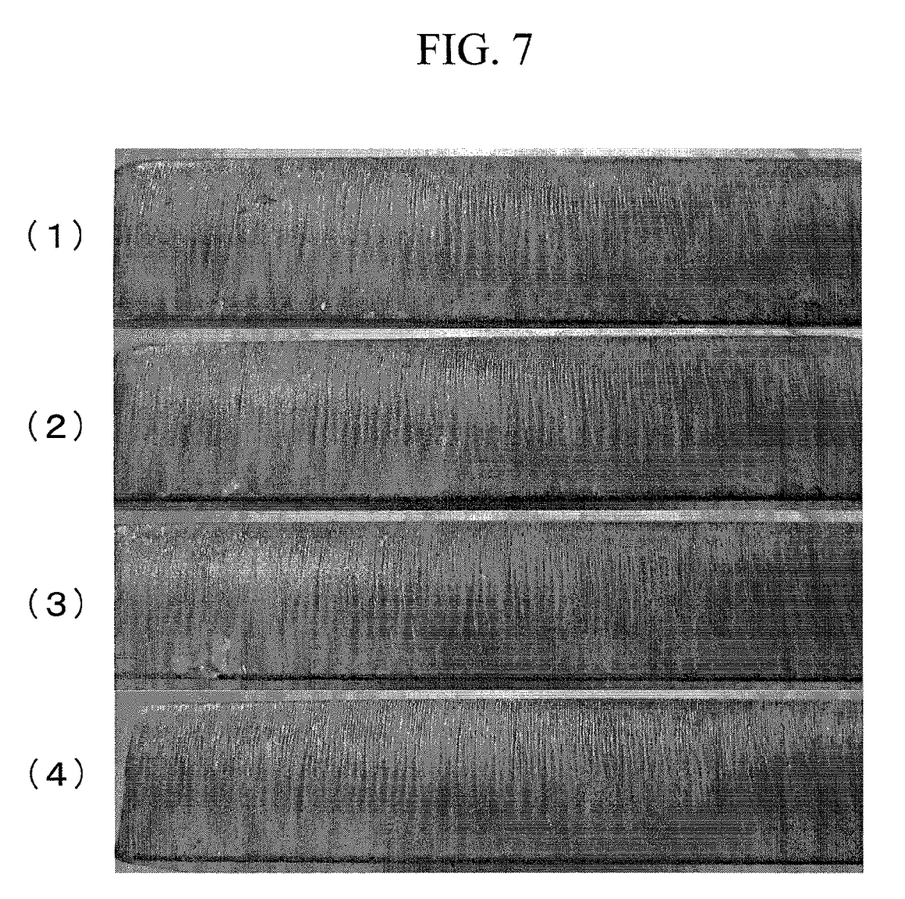
FIG. 7 is a photograph showing cut surfaces of a workpiece that has been cut by using the laser cutting apparatus according to the embodiment of the present invention.

Therefore, the moving portion 6 is moved with respect to the supporting portion 8, thereby changing the positional relationship between the optical fiber 3 fixed to the moving portion 6 and the optical system 7 fixed to the supporting portion 8, and thus, the energy-intensity distribution is adjusted so as to be substantially equal across the X-Y plane at the processing point. As shown in FIG. 6, when the intensity-peak portions are substantially equal over the X-Y plane, thus forming a ring shape, a stable energy-intensity distribution is achieved inside the ring-shaped peak portions. When the workpiece 20 is cut by using the cutting head 4 adjusted in this way, fine cut surfaces are obtained by cutting in any direction, as shown in FIG. 7. As shown in FIG. 8, when the cutting direction of the workpiece 20 is changed (directions (1) to (4) in the figure) while maintaining the cutting head 4 in the fixed state without rotating it about its axis, the cut surfaces in FIG. 7 are obtained as a result. This is likely because surfaces of the laser beams that come in contact with the workpiece 20 all have high energy intensities, making an oxidation imbalance less likely to occur.

It suffices to adjust the positional relationship between the moving portion 6 and the supporting portion 8 once during manufacturing, that is, before shipping. FIGS. 3 and 4 indicate that the energy-intensity distribution becomes uneven when the laser oscillator 2, the optical fiber 3, or the cutting head 4 is replaced. Therefore, the bias in the energy-intensity distribution is likely due to individual variability among the laser beams emitted from the laser oscillators 2, the connection portions of the optical fibers 3, or manufacturing and assembling errors of the cutting heads 4. Specifically, the energy-intensity distribution does not normally change unless the laser oscillator 2 is replaced or the connections of the optical fiber 3 are changed; therefore, it suffices to adjust the positional relationship between the moving portion 6 and the supporting portion 8 once during manufacturing, that is, before shipping.

Note that, with the laser cutting apparatus 1 in which the laser oscillator 2 is replaced, the positional relationship between the moving portion 6 and the supporting portion 8 may be adjusted by using the moving portion 6 and the beam-mode measurement unit 21 every time the processing setting is changed.

In addition, although the above-described embodiment has been described in terms of a case in which the energy-intensity distribution of the laser beam is changed by adjusting the relative positional relationship between the moving portion 6 and the supporting portion 8 in the X-Y plane, the present invention is not limited to this example. For example, the energy-intensity distribution of the laser beam may be changed by tilting the optical axis direction of the laser beam radiated from the optical fiber 3 with respect to the axis of the optical system 7. In this case, the moving portion 6 or the supporting portion 8 is provided with a moving/adjusting portion having a mechanism for tilting the moving portion 6 with respect to the supporting portion 8, instead of the mechanism for moving the moving portion 6 relative to the supporting portion 8 in the X-Y plane.

REFERENCE SIGNS LIST 1 laser cutting apparatus
2 laser oscillator
3 optical fiber
4 cutting head
5 processing stage
6 moving portion
7 optical system (lens)
8 supporting portion
20 workpiece
21 beam-mode measurement unit (intensity-distribution measuring portion)

The invention claimed is:

1. A laser cutting apparatus for cutting a workpiece by radiating a laser beam thereon, the laser cutting apparatus comprising:
  a laser entrance portion to which an optical fiber that transmits the laser beam is fixed; and
  a lens through which the laser beam radiated from the optical fiber fixed by the laser entrance portion passes,
  wherein the laser entrance portion includes a moving portion for moving or tilting the optical fiber with respect to the lens, and a fixing portion that fixes the moved or tilted optical fiber with respect to the lens,
  wherein intensity-peak portions become equal and form a ring shape in an energy-intensity distribution on a plane which includes a cut portion of the workpiece and which is perpendicular to a beam axis of the laser beam, and wherein the fixing portion fixes the moved or tilted optical fiber with respect to the lens in a state in which the optical fiber has been moved or tilted with respect to the lens and in which a positional relationship between the optical fiber held by the moving portion and the lens has been adjusted based on a measured energy-intensity distribution of the laser beam on the plane which includes the cut portion of the workpiece.

2. A laser cutting apparatus according to claim 1, further comprising:

an intensity-distribution measuring portion that measures an energy-intensity distribution of the laser beam radiated from the lens, wherein the moving portion is configured to move or tilt the optical fiber based on the measured energy-intensity distribution so that the intensity-peak portions become equal and form the ring shape in the energy-intensity distribution on the plane which includes the cut portion of the workpiece and which is perpendicular to the beam axis of the laser beam.

3. A laser cutting method for cutting a workpiece by radiating a laser beam thereon, by using a laser cutting apparatus including a laser entrance portion to which an optical fiber that transmits the laser beam is fixed and a lens through which the laser beam radiated from the optical fiber fixed by the laser entrance portion passes, the laser cutting method comprising:

moving or tilting the optical fiber with respect to the lens, and adjusting a positional relationship between the optical fiber and the lens in such a manner that intensity-peak portions become equal and form a ring shape in an energy-intensity distribution on a plane which includes a cut portion of the workpiece and which is perpendicular to a beam axis of the laser beam; and fixing the moved or tilted optical fiber with respect to the lens.

* * * * *